United States Patent Office 3,456,412
Patented July 22, 1969

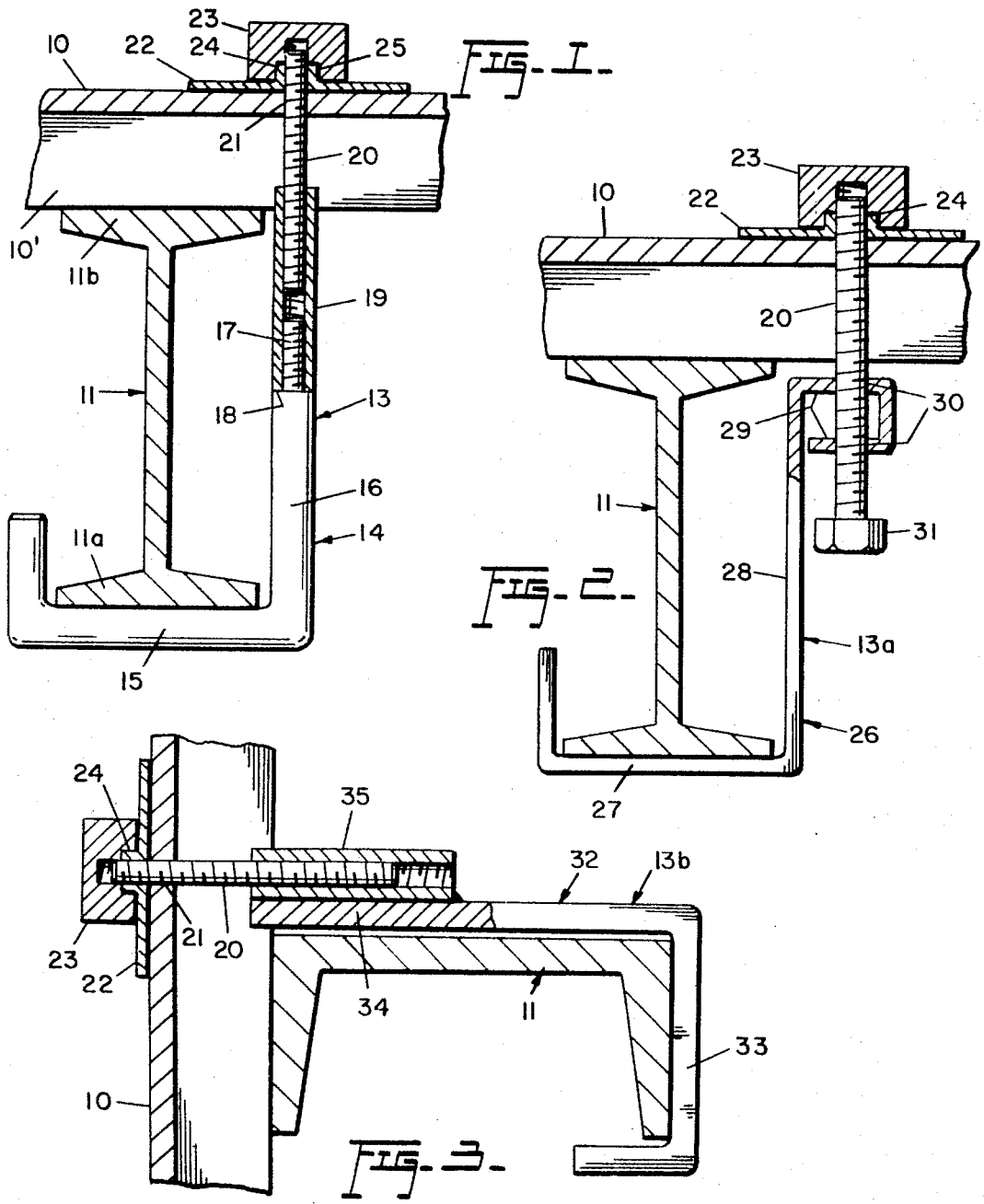

3,456,412
ADJUSTABLE FASTENER FOR STRUCTURAL
COMPONENTS
Robert Decombas, 11 Allee de Chartres,
Livry-Gargan, France
Filed Mar. 18, 1968, Ser. No. 713,582
Claims priority, application France, Mar. 20, 1967,
99,440
Int. Cl. E04d 3/04; E04f 13/00
U.S. Cl. 52—486                                   8 Claims

ABSTRACT OF THE DISCLOSURE

For use in securing sheeting of a building structure to a supporting beam, a fastener which consists of a hook-shaped beam embracing member having a screw-threaded socket provided thereon. A screw-threaded shaft adjustably engages the socket and projects outwardly through the sheeting. A sheeting-engaging washer and a cap nut are provided on the projecting end portion of the shaft, the washer being formed with an annular sealing ring which is seated in a counterbore of the cap nut.

---

This invention relates to new and useful improvements in building structures, particularly those of industrial buildings wherein the roof and/or side walls are covered by sheeting supported by beams, and wherein some type of fasteners are utilized to secure the sheeting to the beams.

Conventional fasteners used for this purpose usually consist of a bar of galvanized iron which is bent around the beam and has a screw-threaded end portion projecting outwardly through the sheeting for reception of a washer and a tensioning nut. A conventional fastener of this type presents an unattractive appearance in that the screw-threaded end portion of the bar protrudes from the nut, and such protrusions on several fasteners very often are not of the same length. Moreover, the exposed screw-threads are subjected to oxidation and corrosion, particularly in the usually polluted atmosphere of industrial buildings, and still further, there is no positive seal between the washer and the nut on the screw-threaded end portion of the fastener bar.

In an effort to relieve the harmful effects of oxidation and corrosion, conventional fasteners have been made of stainless steel and of aluminum, but in both these instances the unattractive appearance of the protruding bar portions still exists. Also, stainless steel bars do not possess ductility such as would enable them to be easily shaped for proper engagement with the beam, while fasteners made of aluminum lack necessary strength in their screw-threaded portions to facilitate proper tensioning by tightening of the associated nut.

The principal object of this invention is to eliminate the above outlined disadvantages of conventional fasteners, this being attained by the provision of an improved fastener which utilizes a hook-shaped beam engaging member in conjunction with a screw-threaded shaft, with an end portion of the shaft projecting through the sheeting to carry a washer and a tensioning nut. However, the nut is a closed cap nut which fully encloses the projecting end portion of the shaft, so that the latter is protected against corrosion and does not by its protrusion detract from the appearance of the assembly. An important feature of the invention resides in an adjustable connection of the screw-threaded shaft to the beam engaging member, this serving to accommodate beams and sheeting of different thicknesses and also to assure that the shaft projects through the sheeting only to the extent that its projecting end portion may be covered and protected by the cap nut. As another important feature, the invention provides a positive seal between the cap nut and the washer on the shaft.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary view, partly in elevation and partly in section, showing one embodiment of the fastener of the invention;

FIG. 2 is a view similar to FIG. 1 but showing a modified embodiment; and

FIG. 3 is a view similar to FIG. 1 but showing another modified embodiment of the invention.

Referring now to the accompanying drawings in detail, and more particularly to FIG. 1 thereof, the numeral 10 designates sheeting of any suitable material such as may be used for covering the roof and/or side walls of an industrial building structure, the sheeting being supported by a plurality of beams, one of which is shown at 11. The beam 11 includes an inner flange 11a and an outer flange 11b, the latter having the sheeting 11 placed thereagainst as shown. The sheeting may be flat, as for example, flat sheet metal or plastic panels placed directly against the beam flange 11b, or such panels may be corrugated as shown in elevation at 10'.

In any event, the invention concerns itself with the provision of an improved fastener 13 for securing the sheeting 10 to the beam 11. The fastener 13 comprises a hook-shaped member 14 which may be formed from round bar stock, the member 14 including a bill portion 15 which embraces the inner flange 11a of the beam, and a shank portion 16 which extends alongside of the beam 11 in the direction of the sheeting 10. The bill portion 16 terminates in a diametrically reduced, screw-threaded connecting element 17 with an annular shoulder 18 at the base thereof.

The fastener 13 also includes socket means in the form of an internally screw-threaded tube 19, one end portion of which is threaded onto the connecting element 17 and into abutment with the shoulder 18, while the other end portion of the tube adjustably receives a screw-threaded shaft 20. The shaft 20 projects outwardly through an aperture 21 formed in the sheeting 10 to carry a washer 22 and a cap nut 23, it being particularly noted that the closed cap nut fully encloses the projecting end portion of the shaft 20 and thereby safeguards the same against damage by moisture, corrosion, and the like. Also, the cap nut presents an attractive appearance which is not obtained in conventional fasteners using ordinary nuts with the screw shaft protruding therefrom to a greater or lesser extent. The socket tube 19 is of sufficient length to permit longitudinal adjustment of the shaft 20, not only to accommodate different thicknesses of beams and sheeting, but also to assure that the shaft 20 projects outwardly through the sheeting only to an extent that it can be accommodated within the closed cap nut 23.

The washer 22 is formed integrally at its inner edge with an annular sealing ring 24 which is seated in a counterbore 25 provided in the washer-engaging face of the nut, thus affording a positive seal between the cap nut and the washer on the projecting end portion of the shaft 20 when the nut is tightened to tension the hook-shaped member 14 against the beam flange 11a and firmly draw the sheeting 10 against the beam.

FIG. 2 shows a modified embodiment of the invention wherein the fastener 13a includes a hook-shaped member 26 formed from flat bar stock, the member 26 including a beam-embracing bill portion 27 and a shank portion 28 which is reversely angulated to provide a pair of spaced apart portions 29 formed with coaxial, screw-threaded apertures 30 to adjustably receive the screw shaft 20. Thus, the screw-threaded portions 29 of the fastener 13a constitute an equivalent of the socket tube 19 in the fastener 13, but otherwise the operation of the device is the same. If desired, the screw shaft 20 in the fastener 13a may be provided at its inner end with a polygonal head 31 to receive a suitable wrench (not shown) for rotating the screw shaft and longitudinally adjusting the same in the threaded apertures 30.

FIG. 3 shows another modification of the invention wherein the fastener 13b includes a hook-shaped member 32 which is also formed from flat bar stock and has a beam-embracing bight or bill portion 33 and a shank portion 34. In this embodiment the screw shaft 20 adjustably engages a socket in the form of an internally screw-threaded tube 35 which is suitably secured, as by welding or the like, to the shank portion 34 of the member 32, as will be readily apparent.

While in the drawings the embodiments of FIGS. 1 and 2 are oriented so that the sheeting 10 is in a horizontal plane, as for example on a building roof, and in the embodiment of FIG. 3 the sheeting is in a vertical plane, as for example on a side wall of a building, it will be understood that all three embodiments may be used selectively on the roof or on the side wall, as desired. It may be also noted that once the screw shaft 20 is adjusted longitudinally in the socket (19, 29 or 35) to suit a particular beam and sheeting thickness with a predetermined extent of projection of the screw shaft outside the sheeting, the device is tensioned from the outside by tightening of the nut 23.

What is claimed as new is:

1. In a building structure, the combination of a supporting beam having inner and outer flanges, sheeting applied to the outer flange of said beam, and a fastener securing said sheeting to the beam, said fastener comprising a hook-shaped member having a bill portion embracing the inner flange of the beam and also having a shank portion extending alongside the beam in the direction of said sheeting, screw-threaded socket means provided on said shank portion, a screw-threaded shaft adjustably engaging said socket means and projecting outwardly through an aperture in said sheeting, a washer positioned on the projecting portion of said shaft in abutment with the sheeting, said washer being provided integrally at its inner edge with an annular sealing ring, and a cap nut threaded on the projecting end of said shaft against said washer, said cap nut being provided in its washer-engaging face with a counterbore having said sealing ring seated therein.

2. The structure as defined in claim 1 wherein said hook-shaped member is formed from round bar stock and includes a diametrically reduced screw-threaded connecting element at the end of said shank portion with an annular shoulder at the base of said element, said socket means comprising an internally screw-threaded tube having one end portion thereof threaded on said element in abutment with said shoulder, said screw-threaded shaft extending adjustably into the other end portion of said tube.

3. The structure as defined in claim 1 wherein said hook-shaped member is formed from flat bar stock, said socket means comprising an internally screw-threaded tube secured laterally to the shank portion of said member.

4. The structure as defined in claim 1 wherein said hook-shaped member is formed from flat bar stock which is angulated reversely to provide a pair of spaced apart bar portions at said shank portion of said member, said bar portions being formed with coaxial screw-threaded apertures constituting said socket means for said shaft.

5. A fastener for securing sheeting of a building structure to a supporting beam, said fastener comprising a hook-shaped member having a beam-engaging bill portion and also having a shank portion extending from the bill portion, screw-threaded socket means provided on said shank portion, a screw-threaded shaft adjustably engaging said socket means and adapted to project outwardly through sheeting, a sheeting engaging washer positioned on the outer end portion of said shaft, said washer being provided integrally at its inner edge with an annular sealing ring, and a cap nut threaded on the outer end of said shaft against said washer, said cap nut being provided in its washer-engaging face with a counterbore having said sealing ring seated therein.

6. The device as defined in claim 5 wherein said hook-shaped member is formed from round bar stock and includes a diametrically reduced screw-threaded connecting element at the end of said shank portion with an annular shoulder at the base of said element, said socket means comprising an internally screw-threaded tube having one end portion thereof threaded on said element in abutment with said shoulder, said screw-threaded shaft extending adjustably into the other end portion of said tube.

7. The device as defined in claim 5 wherein said hook-shaped member is formed from flat bar stock, said socket means comprising an internally screw-threaded tube secured laterally to the shank portion of said member.

8. The device as defined in claim 5 wherein said hook-shaped member is formed from flat bar stock which is angulated reversely to provide a pair of spaced apart bar portions at said shank portion of said member, said bar portions being formed with coaxial screw-threaded apertures constituting said socket means for said shaft.

References Cited

UNITED STATES PATENTS

| | | | |
|---|---|---|---|
| 2,014,451 | 9/1935 | Pfeifer | 287—189.35 |
| 2,611,458 | 9/1952 | Hammitt et al. | 52—549 X |
| 3,300,929 | 1/1967 | Fischer | 52—549 X |

FOREIGN PATENTS

| | | |
|---|---|---|
| 208,176 | 5/1957 | Australia. |
| 590,921 | 3/1925 | France. |

ALFRED C. PERHAM, Primary Examiner

U.S. Cl. X.R.

52—478, 483, 549, 714; 287—189.35